(12) United States Patent
Balakrishnan

(10) Patent No.: US 8,816,596 B2
(45) Date of Patent: Aug. 26, 2014

(54) DIMMER-DISABLED LED DRIVER

(71) Applicant: Power Integrations, Inc., San Jose, CA (US)

(72) Inventor: Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 104 days.

(21) Appl. No.: 13/679,748

(22) Filed: Nov. 16, 2012

(65) Prior Publication Data

US 2013/0069555 A1 Mar. 21, 2013

Related U.S. Application Data

(63) Continuation of application No. 12/828,049, filed on Jun. 30, 2010, now Pat. No. 8,334,658.

(51) Int. Cl.
*H05B 37/02* (2006.01)

(52) U.S. Cl.
USPC ........... 315/209 R; 315/72; 315/210; 315/246

(58) Field of Classification Search
USPC .......... 315/209 R, 210, 227 R, 246, 247, 283, 315/291, 307, 308, 360, 209, 72, 172
See application file for complete search history.

(56) References Cited

U.S. PATENT DOCUMENTS

| | | | |
|---|---|---|---|
| 8,456,095 B2* | 6/2013 | Huynh | 315/209 R |
| 8,569,972 B2* | 10/2013 | Melanson | 315/307 |
| 2011/0121754 A1* | 5/2011 | Shteynberg et al. | 315/294 |
| 2011/0241557 A1* | 10/2011 | Grotkowski et al. | 315/246 |
| 2012/0098454 A1 | 4/2012 | Grotkowski et al. | |

* cited by examiner

*Primary Examiner* — Thienvu Tran
*Assistant Examiner* — Christopher Lo
(74) *Attorney, Agent, or Firm* — Blakely Sokoloff Taylor & Zafman LLP

(57) ABSTRACT

An integrated circuit controller for use in a light emitting diode (LED) driver includes a comparator, an input signal absence timer and a regulator circuit. The comparator receives a first voltage representative of an ac input signal and compares the first voltage with a reference voltage. The input signal absence timer determines whether the first voltage is less than the reference voltage for a threshold duration and in response thereto generates a detect signal indicating that a portion of an ac half cycle is absent from the ac input signal. The regulator circuit controls switching of a switch to regulate a transfer of energy from the ac input signal to an LED load. The regulator circuit is disabled from switching the switch in response to the detect signal indicating the absence of the portion of the ac half cycle from the ac input signal.

16 Claims, 7 Drawing Sheets

DIMMER-DISABLED LED DRIVER

REFERENCE TO PRIOR APPLICATION

This application is a continuation of U.S. application Ser. No. 12/828,049, filed Jun. 30, 2010. U.S. application Ser. No. 12/828,049 is hereby incorporated by reference.

BACKGROUND INFORMATION

1. Field of the Disclosure

The present invention relates generally to circuits that drive light emitting diodes (LEDs). More specifically, the present invention relates to circuits that LED driver circuits that may include dimming circuitry.

2. Background

As light emitting diode (LED) lighting becomes more affordable and increases in popularity, many LED light sources are to be replacements for traditional incandescent light bulbs. Accordingly, these LED light sources designed to be compatible with in existing sockets that were originally designed to work with conventional incandescent light bulbs. Many ac/dc LED driver circuits are designed to operate and drive the LED light sources when supplied from an ac source. Sometimes, the existing light switches used to turn on and off the lights include a dimming circuit, such as a triac. Thus, the ac source supplying power to the LED driver circuit may be connected or disconnected from the input of the LED driver circuit by a user with an ordinary on/off switch, or the supply of power from the ac source may also be controlled electronically with the dimming circuit, such as a triac.

A triac generally dims the light from an incandescent light bulb by varying the percentage of time, or the portion of each ac half cycle of an ac input signal, that is removed from an ac input signal supplying power to the incandescent light bulb.

In response to a triac varying the percentage of time, or portion of each ac half cycle that is removed from the ac input signal supplying power to the LED driver circuit, the LED driver circuit can be configured handle this circumstance in a variety of ways. For instance, the LED driver circuit can be designed to be unresponsive to the variation in the ac input signal caused by the triac. In the alternative, the LED driver circuit may also be configured so that the output of the LED driver responds to the variation for example by varying the LED driver circuit output voltage and or current. If the LED driver circuit output voltage or current is reduced as the percentage of the mains cycle for which the ac source is disconnected from the input to the LED driver circuit is increased, the result will be a form of dimming of the LED light output. This could be deigned to look like the dimming of a normal incandescent bulb.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
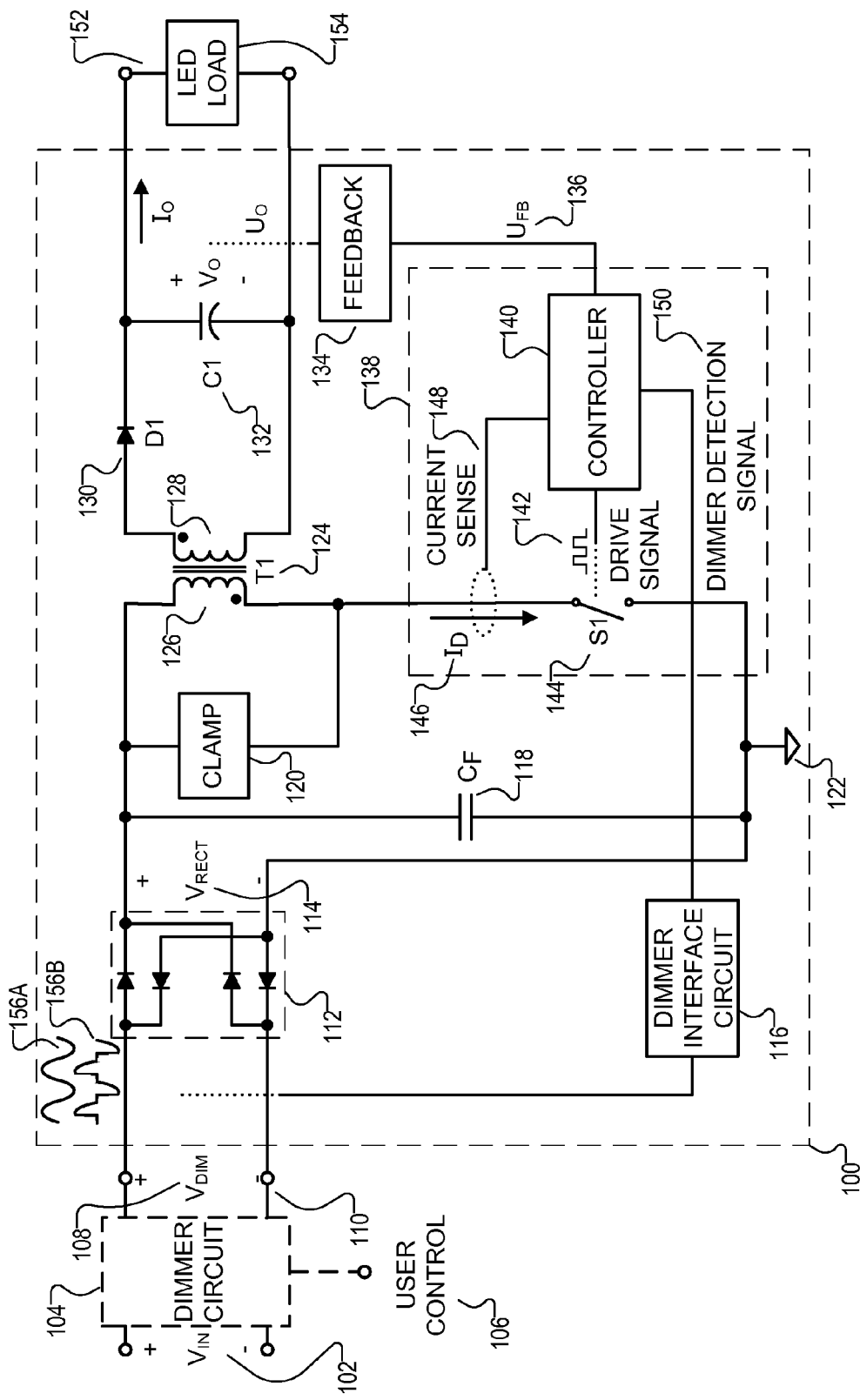
FIG. 1 is a schematic illustrating generally an example LED driver circuit that is coupled to be disabled if a user attempts to dim the light from an LED load with a dimmer circuit at the ac source in accordance with the teachings of the present invention.

Methods and apparatuses for implementing a dimmer disabled LED driver circuit are described. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As summarized previously, an LED driver circuit may respond to the variation of an ac signal by a dimmer circuit, such as a triac, in a variety of ways. For instance, the LED circuit could be designed to be unresponsive to the variations in the ac signal caused by the triac, or the LED circuit could be designed so that the output of the LED driver responds to the variation caused by the by varying the LED driver circuit output voltage and/or current to cause dimming of the LED light output, which could be designed to appear like the dimming of a normal incandescent bulb.

There are several problems with the approaches described above. First, if the output of the LED driver does not respond to the variations in the ac signal caused by the dimming circuit, or triac, then the LED driver normally attempts to regulate to the same output power, even when the average input voltage is far below normal. This increases stress on the LED driver circuit, which may result for example in subjecting a power switch to higher currents and longer on times.

Second, if the LED driver does try to respond to the variations in the ac signal, such as the removal of portions of each ac half cycle from the ac input signal caused by the dimming circuit, by dimming the LED light source, then the LED driver circuit requires significant circuitry, which results in extra cost and complexity because of the additional circuitry within the LED driver circuit to accommodate the removal of portions of each ac half cycle from the ac signal caused by the dimming circuit. Indeed, the natural behavior of simple low cost driver circuits is to continue to regulate the LED driver circuit output regardless of the input voltage.

As will discussed in further detail below, examples of an LED driver circuit in accordance with the teachings of the present invention provide a simple low cost solution for an LED driver circuit. The input of the LED driver circuit may, or may not be, coupled to an ac source with dimmer circuit such as a triac. In one example, the LED driver functions as a normal low cost driver circuit and regulates the output regardless of the input voltage. In one example, the LED driver circuit also includes a dimmer disabler circuit that is coupled to disable the output of the LED driver in the event that a user attempts to set a dimmer circuit at the ac source, which would remove a portion of each ac half cycle from the ac signal to dim the brightness of the LED light source at the output of the LED driver circuit. In one example, the LED driver circuit resumes regulating the output of the LED driver circuit as normal after being restarted and/or, in one example, after the dimmer circuit has been reset not to remove a portion of each ac half cycle the ac signal. Accordingly, the LED driver circuit functions normally as a low cost driver circuit and regulates the output if the user sets the dimmer circuit not to dim the brightness of the LED light source.

To illustrate, FIG. 1 shows generally one example of an LED driver circuit 100 having an input 110 and an output 152 in accordance with the teachings of the present invention. As shown, output 152 is coupled to drive an LED light source, which is labeled LED load 154, and input 110 is coupled to receive an ac input signal $V_{IN}$ 102 from an ac source. In one example, input 110 is an ac input and the ac input signal $V_{IN}$ 102 is an ac input signal received from an ac source. As will be discussed, LED driver circuit 100 functions as a normal low cost driver circuit and regulates the output whether or not a dimmer circuit is included at the input 110. In the illustrated example, a dimmer circuit 104 is shown for explanation purposes and is therefore included at input 110 of LED driver circuit 100. Dimmer circuit 104 may be a triac, and would be coupled to be responsive to user control 106, which may, or may not, be set to disrupt the supply of ac power and remove portions of each ac half cycle from the ac input signal $V_{IN}$ 102 for one or more consecutive ac half cycles of the ac input signal $V_{IN}$ 102. In the example, if there is a dimmer circuit 104 included at input 110, the output of dimmer circuit 104 is shown as ac input signal $V_{DIM}$ 108.

Figure 2:
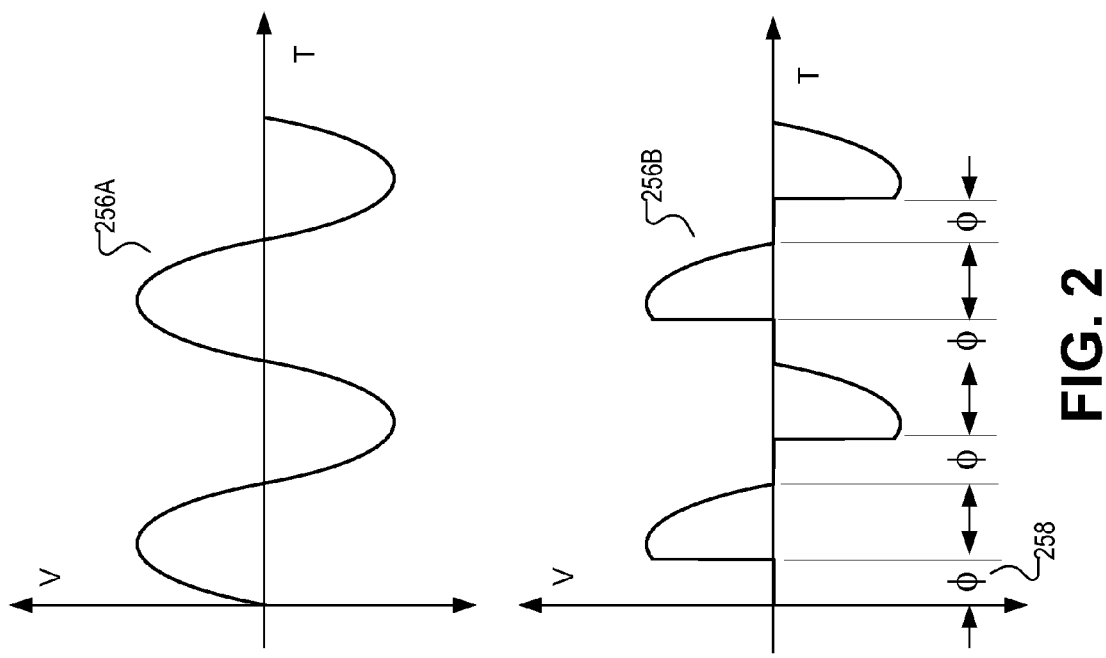
FIG. 2 shows generally input signal waveforms associated with in an example LED driver circuit in accordance with the teachings of the present invention.

To illustrate, attention is directed to FIG. 2, which shows generally ac signal waveforms that may be received by an example LED driver circuit in accordance with the teachings of the present invention. In particular, FIG. 2 shows an ac signal 256A in which no portions have been removed by a dimmer circuit. Thus, ac signal waveform 256A may be representative of an ac input signal $V_{IN}$ 102, or of the corresponding ac input signal $V_{DIM}$ 108 output from dimmer circuit 104 if user control 106 has been set not to remove any portions of the ac signal. Alternatively, ac signal waveform 256A may also be representative of an ac input signal $V_{IN}$ 102 present at input 100 if there is no dimmer circuit 104 included at the input 110 of LED driver circuit 100.

FIG. 2 also shows an ac signal 256B in which portions φ 258 are absent, or have been removed, from each ac half cycle of the ac input signal cycle. In the illustrated example, portions φ 258 would have been removed from each ac half cycle of the ac signal 256B by dimmer circuit 104. It is noted that the ac signal 256B waveform illustrated in FIG. 2 for explanation purposes is referred to as a leading edge phase dimming waveform, in which the portions of each ac half cycle the ac input signal that are removed come immediately after each zero crossing of the input waveform. It is appreciated that there are other examples of dimmer circuits 104, which may use for example trailing edge dimming. In trailing edge dimming circuit implementations, the portion of each ac half cycle from the ac signal that is removed from the input waveform come immediately before the zero crossing. It is appreciated of course that example LED driver circuits 100 in accordance with the teachings of the present invention are compatible with both leading edge and trailing edge dimming circuits in accordance with the teachings of the present invention.

Referring back to ac signal 256B shown in FIG. 2, the absence of portions φ 258 of each ac half cycle from the ac signal 256B would be the result a user control 106 of dimmer circuit 104 being set for the purpose of dimming the brightness of an incandescent light source to be driven by ac signal 256B. In operation, the longer the duration of the absence of portions φ 258 of each ac half cycle from ac signal 256B, the dimmer the light source. The shorter duration of the absence of portions φ 258 of each half cycle from ac signal 256B, the brighter the light source. For maximum brightness, the user control 106 input of dimmer circuit 106 would be set such that the duration of the absence of portions φ 258 of each ac half cycle from ac signal 256B is substantially zero such that a substantially entire ac signal 256B waveform is present for substantially all ac signal cycles.

However, as will be discussed in greater detail below, since an LED load 154, not an incandescent light source, is to be driven by LED driver circuit 100, the LED driver circuit will be disabled in the event there is an absence of portions φ 258 of ac half cycles from the ac input signal for one or more consecutive ac half cycles of the ac input signal in accordance with the teachings of the present invention.

Referring back to FIG. 1, example ac signal 156A is illustrated to be representative of ac input signal $V_{DIM}$ 108 if the user control 106 input of dimmer circuit 106 is set such that the duration of the absence of portions φ 258 of each ac half cycle from ac signal 256B is substantially zero for maximum brightness. FIG. 1 also shows example ac signal 156B, which is illustrated to be representative of ac input signal $V_{DIM}$ 108 if the user control 106 input of dimmer circuit 106 is set such that portions φ 258 are absent of each ac half cycle from ac signal 156B in an attempt to dim the brightness of a light source to be driven by ac signal 156B. As mentioned, LED driver circuit 100 is disabled from driving LED load 154 if portions φ 258 are absent from one or more ac half cycles of ac signal 156B in accordance with the teachings of the present invention. As a result, example LED driver circuit 100 is lower cost because the significant extra cost and complex circuitry that would otherwise have been required in order to accommodate an ac signal 156B with absent portions φ 258 of ac half cycles from the ac signal 156B is no longer necessary accordance with the teachings of the present invention.

Continuing with the example illustrated in FIG. 1, example LED driver circuit 100 includes a rectifier 112, which is coupled to receive ac input signal $V_{DIM}$ 108 from input 110. In one example, a rectifier 112 is coupled to output a rectified signal $V_{RECT}$ 114, which is filtered with a filter capacitor $C_F$ 118 that coupled across the output of rectifier 112 as shown. In the example, LED driver circuit 100 is illustrated as a flyback converter and therefore includes an energy transfer element T1 124, which includes a primary winding 126 and a secondary winding 128. In one example, a clamp circuit 120 is coupled across primary winding 126. In one example, an output diode D1 130 is coupled to the secondary winding 128 and an output capacitor C1 132 is coupled across output 152, across which an output voltage $V_O$ is generated. As shown in the depicted example, LED load 154, which may be for example an LED light source, is coupled to output 152 and is therefore coupled to be driven by output current $I_O$ and output voltage $V_O$ as shown.

In one example, LED driver circuit 100 includes a switch S1 144 that is coupled primary winding 126. In one example, switch S1 144 is also coupled to the negative terminal of the rectifier 112 output as shown. As shown in the example, LED driver circuit 100 also includes a controller 140, which is coupled to receive feedback signal $U_{FB}$ 136 from a feedback circuit 134. In one example, feedback signal $U_{FB}$ 136 is representative of the output 152 of the LED driver circuit 100. In operation, controller 140 is coupled to generate a drive signal 142 to controller switching of switch S1 144 in response to feedback signal $U_{FB}$ 136 to regulate a transfer of energy through energy transfer element T1 124 to the output 152 of LED driver circuit 100 to drive LED load 154. In one example, controller 140 is further coupled to generate drive signal 142 in response to a current sense signal 148, which is responsive to a drain current $I_D$ 146 through switch S1 144.

In one example, controller 140 and switch S1 144 are included in an integrated circuit 138, as shown in FIG. 1. In one example, integrated circuit 138 is a monolithic integrated circuit that includes both controller 140 and switch S1 144. In another example, integrated circuit 138 is a hybrid integrated circuit that includes controller 140 and switch S1 144. In still another example, switch S1 144 may be implemented as a discreet component separate from an integrated circuit that includes controller 140.

In the example illustrated in FIG. 1, controller circuit 140 is coupled to receive the ac input signal $V_{DIM}$ 108 from input 110 through a dimmer interface circuit 116, which is coupled between input 110 and controller 140. In the depicted example, the input of dimmer circuit 116 is coupled to the input 110 to receive the ac input signal $V_{DIM}$ 108, and the output of dimmer interface circuit 116 is shown as dimmer detection signal 150, which in one example is a rectified representation of the ac input signal $V_{DIM}$ 108. In an example in which a dimmer circuit 104 is not included, then dimmer detection signal 150 is a rectified representation of the ac input signal $V_{IN}$ 102 received at input 110 of LED driver circuit 100.

It is noted that the input of dimmer circuit 116 may be coupled to one or both rails of input 110 in accordance with the teachings of the present invention. It is appreciated that in an example where the input of dimmer circuit 116 is coupled to both rails of input 110, then the rectified representation of the ac input signal $V_{DIM}$ 108 or $V_{IN}$ 102 is a full-wave rectified representation of the ac input signal. In an example where the input of dimmer circuit 116 is coupled to only one of the input rails of input 110, then the rectified representation of the ac input signal $V_{DIM}$ 108 or $V_{IN}$ 102 is a half-wave rectified representation of the ac input signal.

Figure 3:
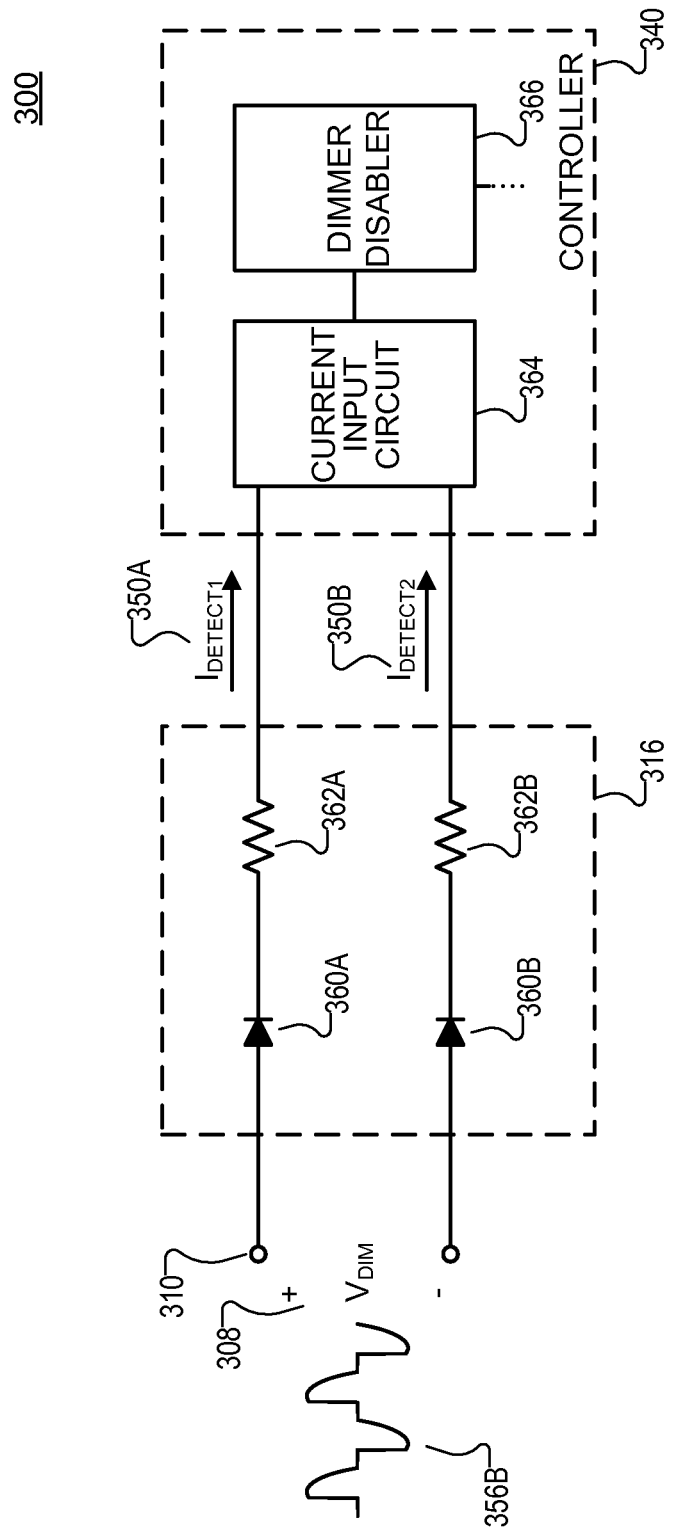
FIG. 3 shows an LED driver circuit with one example of a dimmer interface circuit in accordance with the teachings of the present invention.

To illustrate, FIG. 3 shows a portion of example LED driver circuit 300 with one example of a dimmer interface circuit 316 and a controller 340 in accordance with the teachings of the present invention. It is appreciated that internal details of the portions of example LED driver circuit 300 illustrated in FIG. 3 may be incorporated into LED driver 100 of FIG. 1 in accordance with the teachings of the present invention and that similarly numbered features between the drawings may be substituted for one another in the drawings.

As shown in the depicted example, dimmer interface circuit 316 includes an input 310 coupled to receive an ac input signal $V_{DIM}$ 308. For explanation purposes, the ac input signal $V_{DIM}$ 308 is illustrated to be a waveform 356B in which leading edge portions of ac half cycles from the ac input signal are missing for one or more consecutive ac half cycles from ac input signal cycles, as would be the case in a leading edge phase dimming waveform example. As shown in the example, input 310 includes first and second inputs coupled to receive ac input signal $V_{DIM}$ 308. The first input includes a diode 360A coupled to a resistor 362A. The second input includes a diode 360B coupled to a resistor 362B. In one example, the output of dimmer interface circuit 316 is a dimmer detection signal, which is ac input signal $V_{DIM}$ 308, but in a rectified representation. As shown in FIG. 3, the dimmer detection signal includes currents $I_{DETECT1}$ 350A and $I_{DETECT2}$ 350B.

For explanation purposes, it is noted that the input of dimmer interface circuit 316 is illustrated to be coupled to both rails of input 310. As such, input 310 includes the first and second inputs coupled to receive ac input signal $V_{DIM}$ 308. In another example in which the input of dimmer interface circuit 316 is coupled to only one of the rails of input 310, only one of the first and second inputs would be included. In that example, the output of dimmer interface circuit 316 includes only one of the currents $I_{DETECT1}$ 350A or $I_{DETECT2}$ 350B, which would be a half-wave rectified representation of the ac input signal.

FIG. 3 shows that example controller 340 includes a current input circuit 364, which is coupled to receive $I_{DETECT1}$ 350A and $I_{DETECT2}$ 350B of the dimmer detection signal from dimmer interface circuit 316. Controller 340 also includes a dimmer disabler circuit 366, which is coupled to current input circuit 364. As will be discussed, dimmer disabler circuit 366 is coupled to disable the LED driver circuit 300 in response to an absence of a portion of an ac half cycle from ac input signal $V_{DIM}$ 308 for one or more consecutive ac half cycles from the ac input signal $V_{DIM}$ 308. Such an absence of a portion of the ac half cycle from ac input signal $V_{DIM}$ 308 for one or more consecutive ac half cycles would indicate that a dimmer switch at the input of LED driver circuit 300 has been activated in an attempt to dim the output of a light bulb coupled to an output of LED driver 300. In one example, such an absence could be detected by dimmer disabler circuit if both $I_{DETECT1}$ 350A and $I_{DETECT2}$ 350B are substantially zero currents for a threshold duration for one or more consecutive ac half cycles from the ac input signal $V_{DIM}$ 308 in accordance with the teachings of the present invention.

Figure 4:
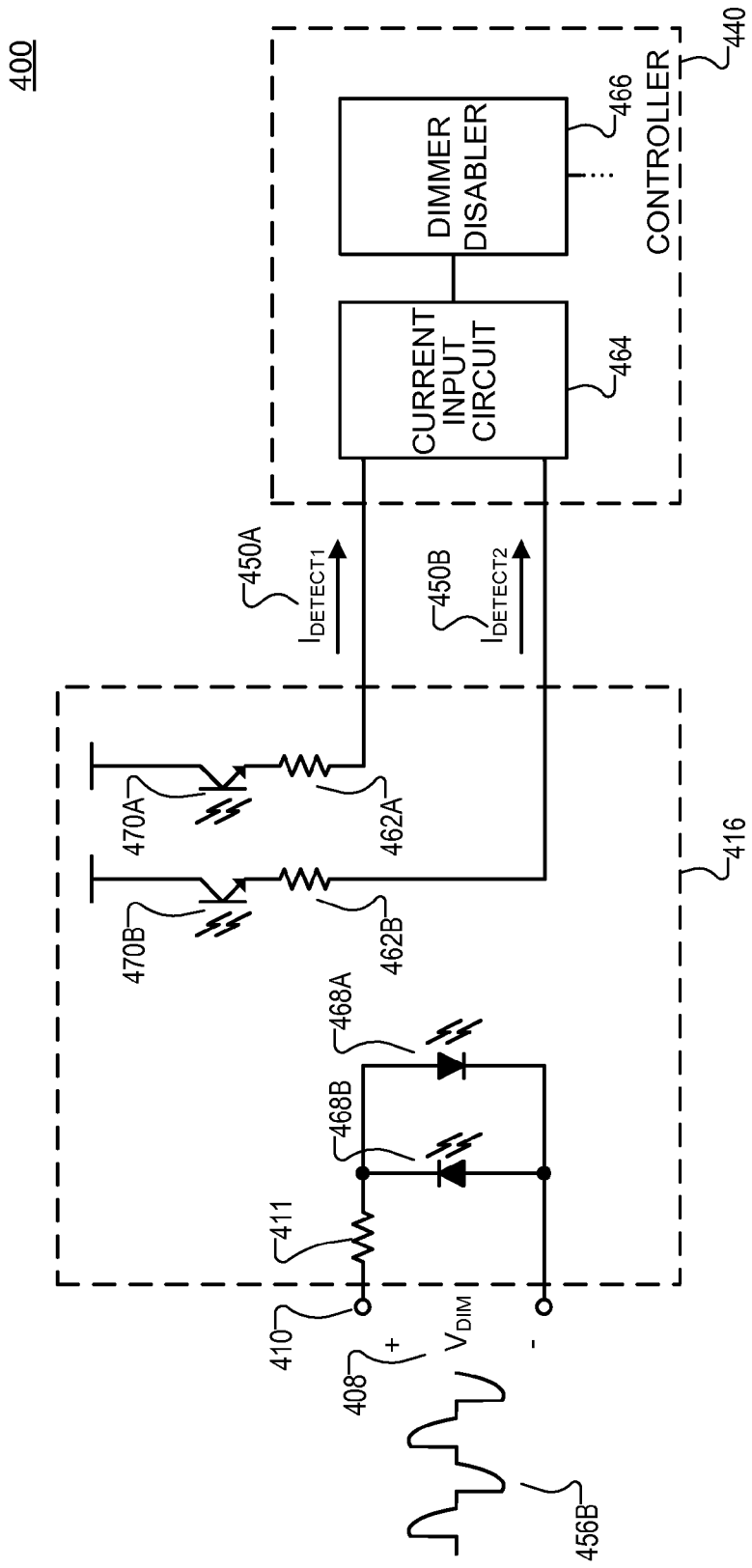
FIG. 4 shows an LED driver circuit with another example of a dimmer interface circuit in accordance with the teachings of the present invention.

FIG. 4 shows a portion of example LED driver circuit 400 with an example of a dimmer interface circuit 416 and a controller 440 in accordance with the teachings of the present invention. It is appreciated that internal details of the portions of example LED driver circuit 400 illustrated in FIG. 4 may be incorporated into LED driver 100 of FIG. 1 in accordance with the teachings of the present invention and that similarly numbered features between the drawings may be substituted for one another in the drawings.

As shown in the depicted example, dimmer interface circuit 416 includes an input 410 coupled to receive an ac input signal $V_{DIM}$ 408 as shown. For explanation purposes, the ac input signal $V_{DIM}$ 408 is illustrated to be a waveform 456B in which leading edge portions of ac half cycles from the ac input signal are missing for one or more consecutive ac input signal cycles, as would be the case in a leading edge phase dimming waveform example. As shown in the example, input 410 includes first and second inputs coupled to receive ac input signal $V_{DIM}$ 408 through a resistor 411 as illustrated in FIG. 4. The first input includes an opto-coupler including an LED portion 468A and a transistor portion 470A. Transistor portion 470A of the opto-coupler is coupled to a resistor 462A. The second input includes an opto-coupler including an LED portion 468B and a transistor portion 470B. Transistor portion 470B of the opto-coupler is coupled to a resistor 462B. In one example, the output of dimmer interface circuit 416 is a dimmer detection signal, which is ac input signal $V_{DIM}$ 408, but in a rectified representation. As shown in FIG. 4, the dimmer detection signal includes currents $I_{DETECT1}$ 450A and $I_{DETECT2}$ 450B.

For explanation purposes, it is noted that the input of dimmer interface circuit 416 is illustrated to be coupled to both rails of input 410. As such, input 410 includes the first and second inputs coupled to receive ac input signal $V_{DIM}$ 408. In another example in which the input of dimmer interface circuit 416 is coupled to only one of the rails of input 410, only one of the first and second inputs would be included. In that example, the output of dimmer interface circuit 416 includes only one of the currents $I_{DETECT1}$ 450A or $I_{DETECT2}$ 450B, which would be a half-wave rectified representation of the ac input signal.

FIG. 4 shows that example controller 440 is similar to example controller 340 of FIG. 3, as example controller 440 also includes a current input circuit 464, which is coupled to receive $I_{DETECT1}$ 450A and $I_{DETECT2}$ 450B of the dimmer detection signal from dimmer interface circuit 416. Controller 440 also includes a dimmer disabler circuit 466, which is coupled to current input circuit 464. As will be discussed, dimmer disabler circuit 466 is coupled to disable the LED driver circuit 400 in response to an absence of a portion of an ac half cycle from the ac input signal $V_{DIM}$ 408 for one or more consecutive cycles ac half cycles from the ac input signal $V_{DIM}$ 408. Such an absence of a portion of ac half cycles from the ac input signal $V_{DIM}$ 408 for one or more consecutive ac half cycles would indicate that a dimmer switch at the input of LED driver circuit 400 has been activated in an attempt to dim the output of a light bulb coupled to an output of LED driver 400. In one example, such an absence could be detected by dimmer disabler circuit if both $I_{DETECT1}$ 450A and $I_{DETECT2}$ 450B are substantially zero currents for a threshold duration for one or more consecutive ac half cycles from the ac input signal $V_{DIM}$ 408 in accordance with the teachings of the present invention.

Figure 5:
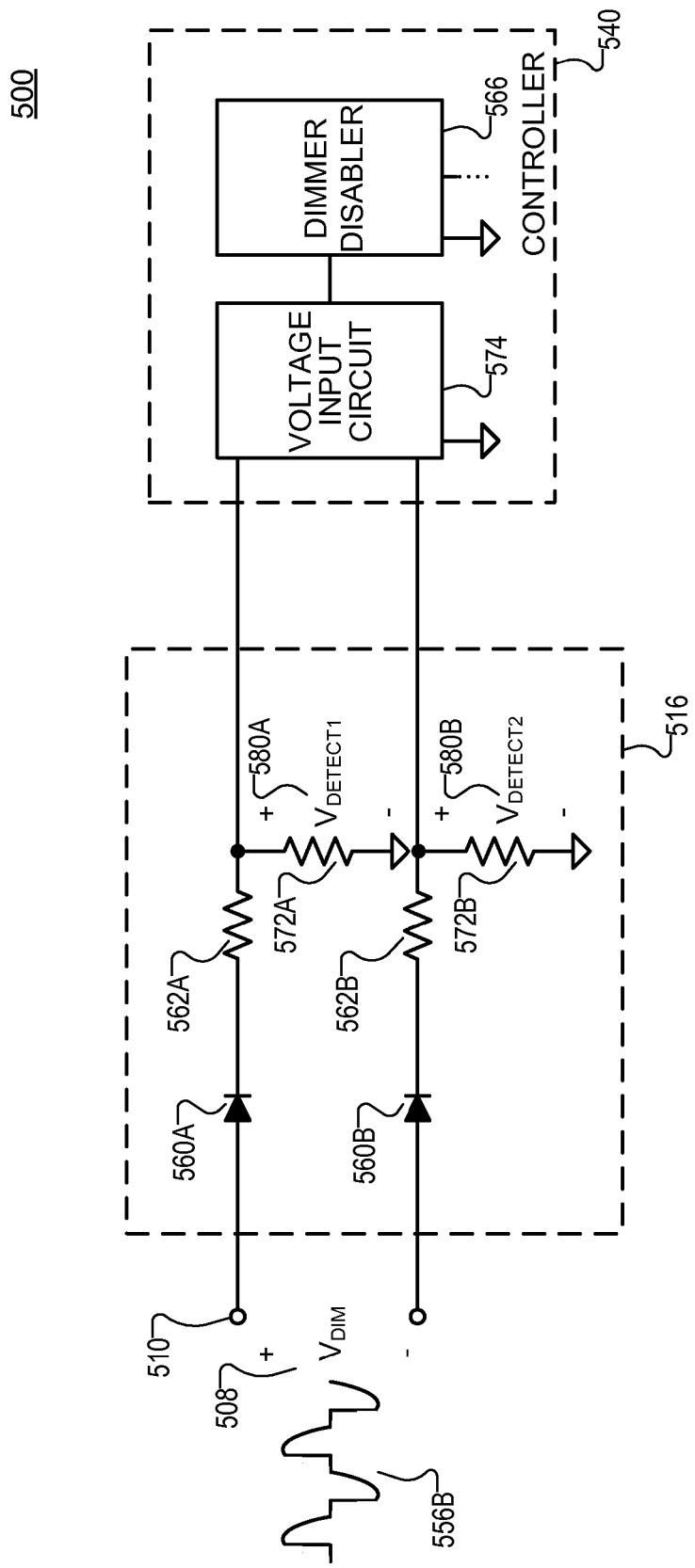
FIG. 5 shows an LED driver circuit with yet another example of a dimmer interface circuit in accordance with the teachings of the present invention.

FIG. 5 shows a portion of example LED driver circuit 500 with an example of a dimmer interface circuit 516 and a controller 540 in accordance with the teachings of the present invention. It is appreciated that internal details of the portions of example LED driver circuit 500 illustrated in FIG. 5 may be incorporated into LED driver 100 of FIG. 1 in accordance with the teachings of the present invention and that similarly numbered features between the drawings may be substituted for one another in the drawings.

As shown in the depicted example, dimmer interface circuit 516 includes an input 510 coupled to receive an ac input signal $V_{DIM}$ 508. For explanation purposes, the ac input signal $V_{DIM}$ 508 is illustrated to be a waveform 556B in which leading edge portions of ac half cycles from the ac input signal are missing for one or more consecutive ac half cycles from the ac input signal $V_{DIM}$ 508, as would be the case in a leading edge phase dimming waveform. As shown in the example, input 510 includes first and second inputs coupled to receive ac input signal $V_{DIM}$ 508. The first input includes a diode 560A coupled to a resistor divider including resistors 562A and 572A. As shown in the example, a voltage $V_{DECTECT1}$ 580A is developed across resistor 572A during operation. The second input includes a diode 560B coupled to a resistor divider including resistors 562B and 572B. As shown in the example, a voltage $V_{DECTECT2}$ 580B is developed across resistor 572B during operation. In one example, the output of dimmer interface circuit 516 is a dimmer detection signal, which is ac input signal $V_{DIM}$ 508, but in a rectified representation. As shown in FIG. 5, the dimmer detection signal includes voltages $V_{DECTECT1}$ 580A and $V_{DECTECT2}$ 580B.

For explanation purposes, it is noted that the input of dimmer interface circuit 516 is illustrated to be coupled to both rails of input 510. As such, input 510 includes the first and second inputs coupled to receive ac input signal $V_{DIM}$ 508. In another example in which the input of dimmer interface circuit 516 is coupled to only one of the rails of input 510, only one of the first and second inputs would be included. In that example, the output of dimmer interface circuit 516 includes only one of the voltages $V_{DETECT1}$ 580A or $V_{DETECT2}$ 580B, which would be a half-wave rectified representation of the ac input signal.

FIG. 5 shows that example controller 540 includes a voltage input circuit 574, which is coupled to receive $V_{DECTECT1}$ 580A and $V_{DECTECT2}$ 580B of the dimmer detection signal from dimmer interface circuit 516. Controller 540 also includes a dimmer disabler circuit 566, which is coupled to voltage input circuit 564. As will be discussed, dimmer disabler circuit 566 is coupled to disable the LED driver circuit 500 in response to an absence of a portion of an ac half cycle from ac input signal $V_{DIM}$ 508 for one or more consecutive ac half cycles from the ac input signal $V_{DIM}$ 508. Such an absence of a portion of the ac half cycle from ac input signal $V_{DIM}$ 508 for one or more consecutive ac half cycles would indicate that a dimmer switch at the input of LED driver circuit 500 has been activated in an attempt to dim the output of a light bulb coupled to an output of LED driver 500. In one example, such an absence could be detected by dimmer disabler circuit if both $V_{DECTECT1}$ 580A and $V_{DECTECT2}$ 580B 450B are substantially zero voltages for a threshold duration for one or more consecutive ac half cycles from the ac input signal $V_{DIM}$ 508 in accordance with the teachings of the present invention.

Figure 6:
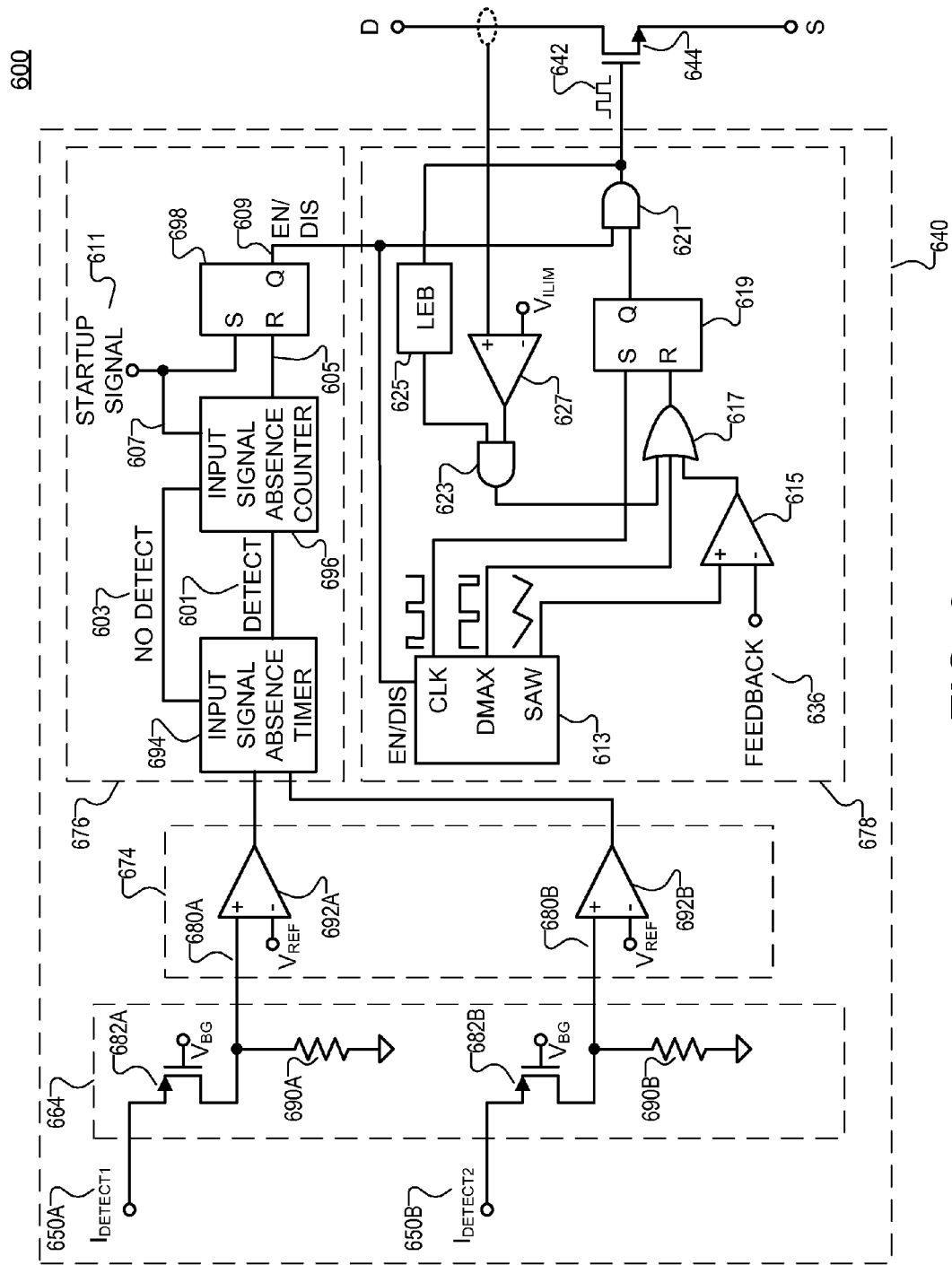
FIG. 6 is a schematic illustrating an example of a controller for use in an LED driver circuit including an example dimmer disabler circuit in accordance with the teachings of the present invention.

FIG. 6 shows a portion of an LED driver circuit 600 including a controller 600 coupled to a switch 644 in accordance with the teachings of the present invention. It is appreciated that internal details of the portions of example LED driver circuits illustrated in FIG. 6 may be incorporated into LED driver circuits of FIGS. 1 and/or 3-5 in accordance with the teachings of the present invention and that similarly numbered features between the drawings may be substituted for one another in the drawings.

As shown in the depicted example, controller 640 includes a current input circuit 664 coupled to receive an input signal, which in the depicted example is illustrated as currents $I_{DETECT1}$ 650A and $I_{DETECT2}$ 650B. In one example, the current $I_{DETECT1}$ 650A is received by current input circuit 664 through a transistor 682A to generate a voltage 680A across resistor 690A as shown. Similarly, as shown in the example of FIG. 6, the current $I_{DETECT2}$ 650B is received by current input circuit 664 through a transistor 682B to generate a voltage 680B across resistor 690B as shown.

It is appreciated that in another example in which input signal includes voltages, e.g. $V_{DECTECT1}$ and $V_{DECTECT2}$, instead of currents, e.g. $I_{DETECT1}$ and $I_{DETECT2}$, that current input circuit 664 is not included in controller 640 and that the voltages $V_{DECTECT1}$ and $V_{DECTECT2}$ of the ac input signal may be received by voltage input circuit 674 as voltages 680A and 680B.

For explanation purposes, it is noted that the input of current input circuit 664 is illustrated as receiving first and second currents $I_{DETECT1}$ 650A and $I_{DETECT2}$ 650B, respectively, which would be the case if the dimmer interface circuit were coupled to both rails of the input. In another example in which the input of dimmer interface circuit were coupled to only one of the rails of the input, only one of the first and second currents $I_{DETECT1}$ 650A and $I_{DETECT2}$ 650B, or only one of the first and second voltages $V_{DECTECT1}$ and $V_{DECTECT2}$, respectively, would be received.

As shown in the depicted example, voltage input circuit 674 includes a comparator 692A coupled to receive voltage 680A and a comparator 692B coupled to receive voltage 680B. In the example, comparators 692A and 692B are coupled to determine whether voltages 680A and 680B are greater than a reference voltage $V_{REF}$. In one example, the reference voltage $V_{REF}$ coupled to comparators 692A and 692B is chosen to be a value to indicate whether or not the ac input signal, as represented by currents $I_{DETECT1}$ 650A and $I_{DETECT2}$ 650B, is a substantially zero signal.

The illustration of FIG. 6 also shows that controller 640 includes a dimmer disabler circuit 676, which includes an input signal absence timer 694 coupled to the outputs of comparators 692A and 692B. In operation, input signal absence timer 694 will determine if the ac input signal, as represented by currents $I_{DETECT1}$ 650A and $I_{DETECT2}$ 650B, is a substantially zero signal for a threshold duration. In one example, if the ac input signal is substantially zero for the threshold duration, then it would indicate that a portion of an ac half cycle from the ac input signal is absent, which corresponds to the absent portions φ 258 in waveforms 256B described in FIG. 2 above. As described above, a dimmer circuit, such as for example dimmer circuit 104 of FIG. 1, removes portions φ 258 of ac half cycles from an ac input signal as shown in FIG. 2 when attempting to dim the brightness of a light bulb to be driven by the ac input signal. In one example, the threshold duration measured by input signal absence timer 694 is designed to be at least a duration that would reasonably reliably identify the presence of a dimmer circuit that has been activated at the input of the LED driver circuit 600 in accordance with the teachings of the present invention. In an example in which the dimmer interface circuit 116 is coupled to both rails of the input 110, and the dimmer detection signal 150 is a full-wave rectified representation of the ac input signal, then the threshold duration would be a value greater than zero in accordance with the teachings of the present invention. In an example in which the dimmer interface circuit 116 is coupled to only one of the rails of the input 110, and the dimmer detection signal 150 is a half-wave rectified representation of the ac input signal, then the threshold duration would be a value greater than fifty percent of the period of the ac input signal cycle in accordance with the teachings of the present invention.

FIG. 6 also shows that dimmer disabler circuit 676 also includes an input signal absence counter 696 and a latch 698. In one example, input signal absence counter 696 is coupled to be reset to an initial value, such as for example zero, in response to a startup signal 611. In one example, startup signal 611 is activated whenever LED driver circuit 600 is started up, or whenever LED driver circuit 600 is restarted. This event could occur for example when LED driver circuit 600 is initially powered, or when power is cycled at the input of the LED driver circuit 600 from an ac source, e.g., the light switch is turned off and on.

In the illustrated example, latch 698 is also set in response to startup signal 611. As will be discussed, when latch 698 is set, the EN/DIS 609 output of latch 698 is set to enable a regulator circuit 678 of controller 640 in accordance with the teachings of the present invention. When latch 698 is reset in response to input signal absence counter 696, the EN/DIS 609 output of latch 698 is set to disable the regulator circuit 678 of controller 640 in accordance with the teachings of the present invention.

Referring back to the input signal absence counter 696, one example of input signal absence timer 694 is coupled to send a detect signal 601 to input signal absence counter 696 when the input signal, as represented by currents $I_{DETECT1}$ 650A and $I_{DETECT2}$ 650B, is a substantially zero signal for the threshold duration during a cycle of the input signal. This would correspond to one of the absent portions φ 258 described in FIG. 2 above being detected. In one example, input signal absence timer 694 is coupled to send a no detect signal 603 to input signal absence counter 696 when the input signal is a not a substantially zero signal for the threshold duration during a cycle of the input signal. This would correspond to a substantially all of the input signal being present, such as for example the substantially entire ac signal 256A shown in FIG. 2 with no absent portions φ 258, or for the case in which the dimmer interface circuit is coupled to only one of the rails of input, a substantially entire half-wave rectified representation of the input signal being present.

In one example, each time the detect signal 601 is received by input signal absence counter 696, the internal count within input signal absence counter 696 is clocked. In one example, each time input signal absence counter 696 is clocked, the internal count within input signal absence counter 696 is incremented. Accordingly, each time another absent portion φ 258 is detected in the input signal, the counter within input signal absence counter 696 is incremented. However, in one example, each time the no detect signal 603 is received by input signal absence counter 696, the counter is reset back to the initial value.

In one example, input signal absence counter 696 is coupled to reset latch 698 with a reset signal 605 when the internal count within input signal absence counter 696 reaches a threshold count in response to detect signals 601 from input signal absence timer 694. In one example, the internal count within input signal absence counter 696 reaches the threshold count of one or more in response to the detection of the absence of the portions φ 258 of ac half cycles from the ac input signal for a threshold plurality of one or more consecutive input signal cycles, without the internal count being reset back to the initial value in response to the no detect signal 603. When this condition occurs, a dimmer circuit that has been activated has been detected at the input of the LED driver circuit 600, and latch 698 is therefore reset to disable the LED driver circuit 600 in accordance with the teachings of the present invention.

In one example, latch 698 is not set again until startup signal 611 sets latch 698 when LED driver circuit 600 is restarted. In this example, when latch 698 is set again in response to startup signal 611, the EN/DIS 609 output of latch 698 is set to re-enable regulator circuit 678 of controller 640 in accordance with the teachings of the present invention.

In another example, after latch 698 had been reset to disable regulator circuit 678, in addition to the startup signal 611 setting latch 698, the dimmer disabler circuit 676 could also be configured to re-enable the regulator circuit in response to the presence of a substantially entire ac input signal for the threshold plurality of one or more consecutive ac half cycles from the ac input signal, e.g., if the user realizes that the LED driver circuit is a dimmer-disabled driver circuit and then turns the dimmer back up to full brightness. In this instance, the ac input signal waveform would change, for example, from a waveform similar to waveform 256B, in which portions φ 258 are removed, to a waveform similar to waveform 256A, in which portions φ 258 are no longer removed by the dimmer.

In the example, the presence of a substantially entire input signal for the threshold plurality of one or more consecutive input signal cycles could be detected by the counter within input signal absence counter 696 being re-initialized after the LED driver circuit 600 is disabled. In one example, the substantially entire ac input signal can be detected by determining if there is a substantially zero input signal for at least the threshold duration, as discussed above, depending on whether a full-wave or half-wave rectified representation of the ac input signal is received by the controller 640 from the dimmer interface circuit. The input signal absence timer 694 would also be coupled to reset the counter within input signal absence counter 696 each time another absent portion φ 258 of an ac half cycle from the ac input signal is detected. However, when an absent portion φ 258 of the ac half cycle from ac the input signal is not detected in the ac input signal cycle, the counter within input signal absence counter 696 is clocked. After the count reaches the threshold plurality of one or more, which would indicate the presence of substantially the entire input signal for the one or more consecutive ac half cycles of the ac input signal, the latch 698 could be set again in response to a signal 607 from the input signal absence counter 696. When the latch 698 is set again, the EN/DIS 609 output of latch 698 is set to re-enable regulator circuit 678 of controller 640 in accordance with the teachings of the present invention.

In the illustrated example, regulator circuit 678 of controller 640 is illustrated as a pulse width modulator (PWM) regulator that is coupled to generate drive signal 642 to control the switching of switch 644 to regulate the energy delivered to the LED load to be coupled to the output of the LED driver circuit 600. As shown, a PWM comparator 615 is coupled to receive a feedback signal 636, which in one example is representative of the output of LED driver circuit 600. Another input of PWM comparator 615 is coupled to receive a sawtooth signal from an oscillator 613 included in the regulator circuit 678. As shown, the output of PWM comparator is coupled to be received by an input of OR gate 617.

In one example, the oscillator 613 is also coupled to generate a clock signal and a duty cycle max signal. In one example, the clock signal from oscillator 613 is coupled to be received at the set input of a latch 619 to indicate the beginning of a new switching cycle of switch 644. The duty cycle max signal is coupled to be received at another one of the inputs of OR gate 617. As shown in the example, the output of OR gate 617 is coupled to reset latch 619 to indicate the termination of an on time of switch 644 for a current switching cycle.

In one example, the output of latch 619 is used to generate drive signal 642 through AND gate 621 to control the switching of the switch 644. In the illustrated example, a current limit comparator is coupled to receive a signal representative of a drain current through switch 644 and compare that signal to a reference current limit value $V_{LIM}$. In one example, the output of the current limit comparator 627 is also coupled to one of the inputs of OR gate 617 through AND gate 623. In one example, a leading edge blanking (LEB) delay circuit is coupled to AND gate 623 to gate the output of comparator 627 during turn on of the switch 644 to help prevent a turn on current spike in switch 644 from accidentally resetting the latch 619.

As shown in the illustrate example, the EN/DIS 609 output of latch 698 is coupled to one of the inputs of AND gate 621 to enable or disable regulator circuit 678 from generating drive signal 642 by gating the output of latch 619 through AND gate 621 in accordance with the teachings of the present invention.

In one example, the EN/DIS 609 output of latch 698 may also be coupled to an enable/disable input of oscillator 613 to disable regulator circuit 678. In this example, when oscillator 613 is disabled, the clock, duty cycle max and sawtooth signals are no longer generated, which also disables regulator 678 from generating drive signal 642 in accordance with the teachings of the present invention.

Figure 7:
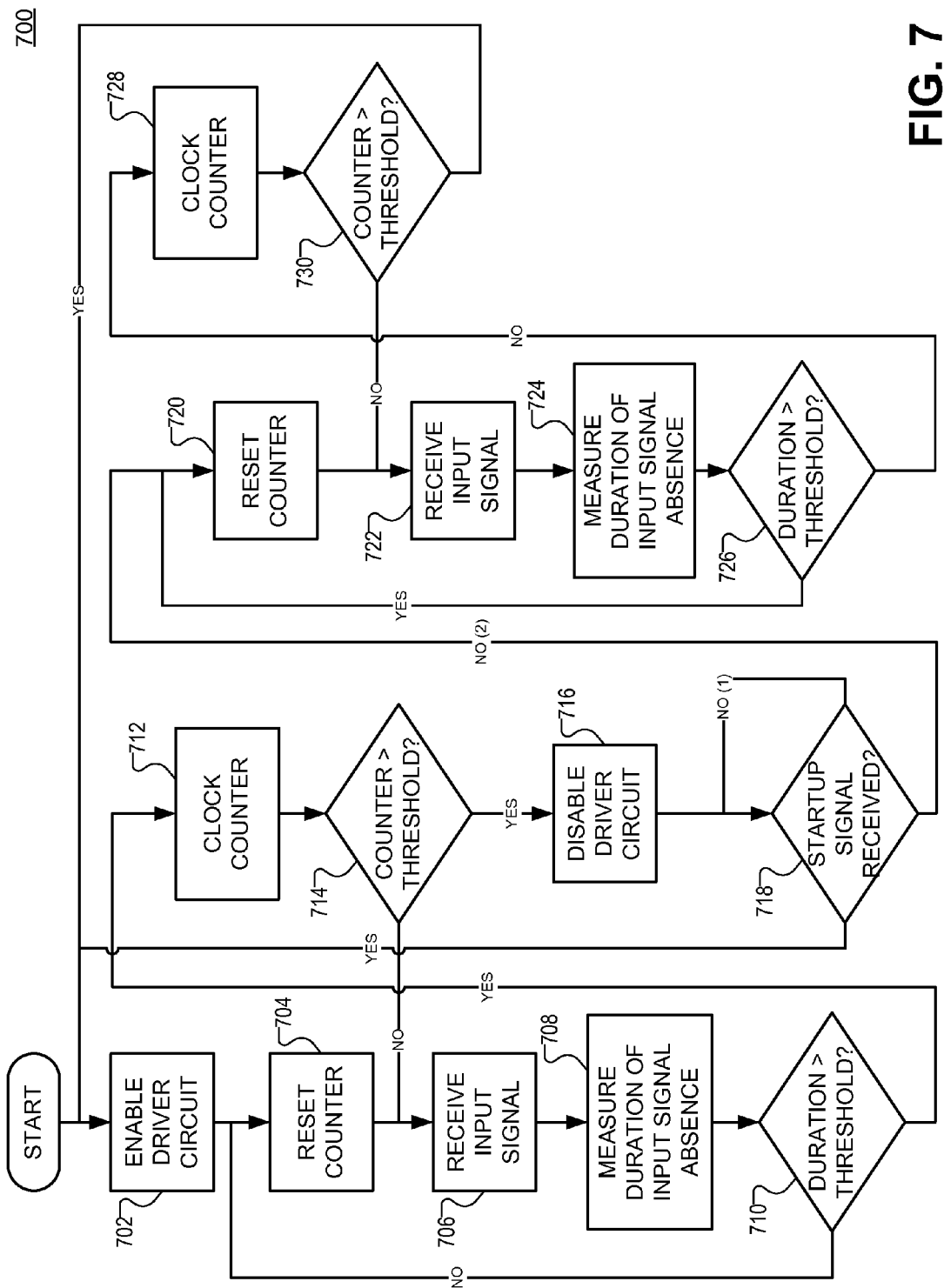
FIG. 7 is a flowchart illustrating an example method for disabling an LED driver circuit in accordance with the teachings of the present invention.

FIG. 7 is a flowchart illustrating an example method for disabling an LED driver circuit in accordance with the teachings of the present invention. As shown at block 702, the driver circuit is enabled, which corresponds to startup signal 611 setting latch 698. At block 704, the counter is reset, which corresponds to the counter within input signal absence counter 696 being initialized to the initial value in response to the startup signal 611.

Block 706 indicates that the input signal is received, which corresponds to the ac input signal being received by the LED driver circuit. Block 708 indicates that a duration of an input signal absence is measured, and block 710 indicates that the measured duration of the input signal absence is compared with a threshold duration. If the measured duration is not greater than the threshold duration, then a portion of an ac half cycle from the ac input signal is determined not to be missing and there is no dimmer circuit activated. In this case, processing returns back to block 704 and the counter is reset.

However, if the measured duration is greater than the threshold duration, then block 712 indicates that the counter is clocked, which in one example means that the counter is incremented. Block 714 then indicates that the counter value is then compared to a threshold count. In one example, the threshold count is chosen to be a value to reasonably reliably indicate that dimmer circuit is actually removing portions of ac half cycles from the ac input signal. If the counter value is not yet greater than the threshold count, then processing then returns back to block 706 and the input signal is continued to be received. However, if the counter value has now reached the threshold count, then it is confirmed that the dimmer circuit is indeed removing portions of ac half cycles from an ac input signal for a threshold plurality of one or more consecutive input signal cycles and the LED driver circuit is then disabled at block 716.

In one example, processing then loops at block 718 until a startup signal is received again, which then returns processing back to block 702, where the LED driver circuit is then re-enabled.

However, in another example, the LED driver circuit could also be re-enabled by the user turning the dimmer switch back up to full brightness. In this example, the counter would be reset at block 720. Processing then continues to block 722, where the input signal is received, and then at block 725, the duration of an input signal absence is measured. At block 726 the measured duration of the input signal absence is compared with the threshold duration. If the measured duration is greater than the threshold duration, then portions of ac half cycles from the ac input signal are still missing and processing returns back to block 720 where the counter is reset again. However, if the measured duration is not greater than the threshold duration, then the counter is clocked at block 728. If the counter has not yet reached the threshold count at block 730, then processing returns back to block 722, where the input signal is continued to be received. However, if the counter value reaches the threshold count, then it is confirmed that the dimmer circuit is no longer removing portions of ac half cycles from an ac input signal and that a substantially entire ac input signal is now being received at the input of the LED driver circuit, which results in processing returning back to block 702, where the LED driver circuit is re-enabled.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An integrated circuit controller for use in a light emitting diode (LED) driver, the controller comprising:
    a comparator coupled to receive a first voltage representative of an ac input signal and to compare the first voltage with a reference voltage;
    an input signal absence timer coupled to an output of the comparator to determine whether the first voltage is less than the reference voltage for a threshold duration and in response thereto generate a detect signal indicating that a portion of an ac half cycle is absent from the ac input signal; and
    a regulator circuit coupled to control switching of a switch to regulate a transfer of energy from the ac input signal to an LED load to be coupled to an output of the LED driver, the regulator circuit coupled to be disabled from switching the switch in response to the detect signal indicating the absence of the portion of the ac half cycle from the ac input signal.

2. The integrated circuit controller of claim 1, wherein the reference voltage has a value such that the first voltage being less than the reference voltage indicates that the ac input signal is substantially zero.

3. The integrated circuit controller of claim 1, further comprising a signal absence counter to detect the absence of the portion of the ac half cycle for consecutive ac half cycles of the ac input signal in response to the detect signal, wherein the regulator circuit is disabled from switching the switch in response to the signal absence counter detecting the absence of the portion of the ac half cycle for consecutive ac half cycles.

4. The integrated circuit controller of claim 3, wherein the regulator circuit comprises a latch coupled to the signal absence counter and to disable the regulator circuit in response to the detection of the absence of the portion of the ac half cycle for the consecutive ac half cycles.

5. The integrated circuit controller of claim 4, wherein the latch is further coupled to enable the regulator circuit to switch the switch in response to a presence of a substantially entire ac input signal for at least one ac half cycle of the ac input signal.

6. The integrated circuit controller of claim 4, wherein the regulator circuit further comprises an oscillator coupled to generate an oscillating signal, wherein the regulator circuit generates a drive signal in response to the oscillating signal to control the switching of the switch, and wherein the latch is coupled to disable the oscillator from generating the oscillating signal in response to the detection of the absence of the portion of the ac half cycle for the consecutive ac half cycles.

7. The integrated circuit controller of claim 4, wherein the regulator circuit further comprises a logic gate that generates a drive signal to control switching of the switch, and wherein the latch is coupled to disable the logic gate from providing the drive signal in response to the detection of the absence of the portion of the ac half cycle for the consecutive ac half cycles.

8. The integrated circuit controller of claim 1, wherein the switch is included in the integrated circuit controller.

9. A light emitting diode (LED) driver circuit, comprising:
    an energy transfer element coupled to an input and to an output of the LED driver circuit;
    a switch coupled to the energy transfer element; and
    an integrated circuit controller coupled to the switch, the controller comprising:
        a comparator coupled to receive a first voltage representative of an ac input signal at the input and to compare the first voltage with a reference voltage;
        an input signal absence timer coupled to an output of the comparator to determine whether the first voltage is less than the reference voltage for a threshold duration and in response thereto generate a detect signal indicating that a portion of an ac half cycle is absent from the ac input signal; and
        a regulator circuit coupled to control switching of the switch to regulate a transfer of energy from the ac input signal to an LED load to be coupled to the output of the LED driver circuit, the regulator circuit coupled to be disabled from switching the switch in response to the detect signal indicating the absence of the portion of the ac half cycle from the ac input signal.

10. The LED driver circuit of claim 9, wherein the reference voltage has a value such that the first voltage being less than the reference voltage indicates that the ac input signal is substantially zero.

11. The LED driver circuit of claim 9, wherein the integrated circuit controller further comprises a signal absence counter to detect the absence of the portion of the ac half cycle for consecutive ac half cycles of the ac input signal in response to the detect signal, wherein the regulator circuit is disabled from switching the switch in response to the signal absence counter detecting the absence of the portion of the ac half cycle for consecutive ac half cycles.

12. The LED driver circuit of claim 11, wherein the regulator circuit comprises a latch coupled to the signal absence counter and to disable the regulator circuit in response to the detection of the absence of the portion of the ac half cycle for the consecutive ac half cycles.

13. The LED driver circuit of claim 12, wherein the latch is further coupled to enable the regulator circuit to switch the switch in response to a presence of a substantially entire ac input signal for at least one ac half cycle of the ac input signal.

14. The LED driver circuit of claim 12, wherein the regulator circuit further comprises an oscillator coupled to generate an oscillating signal, wherein the regulator circuit generates a drive signal in response to the oscillating signal to control the switching of the switch, and wherein the latch is coupled to disable the oscillator from generating the oscillating signal in response to the detection of the absence of the portion of the ac half cycle for the consecutive ac half cycles.

15. The LED driver circuit of claim 12, wherein the regulator circuit further comprises a logic gate that generates a drive signal to control switching of the switch, and wherein the latch is coupled to disable the logic gate from providing the drive signal in response to the detection of the absence of the portion of the ac half cycle for the consecutive ac half cycles.

16. The LED driver circuit of claim 1, wherein the switch is included in the integrated circuit controller.

\* \* \* \* \*